United States Patent Office 3,231,362
Patented Jan. 25, 1966

3,231,362
HERBICIDAL COMPOSITIONS
Rudolf Koloman Pfeiffer, Cambridge, England, assignor to Fisons Pest Control Limited, Cambridgeshire, England
No Drawing. Filed May 20, 1963, Ser. No. 281,759
Claims priority, application Great Britain, May 29, 1962, 20,543/62
7 Claims. (Cl. 71—2.6)

The present invention relates to a herbicidal composition for the selective control of weeds in cereal crops.

In our Great Britain Patent No. 821,039 is described a composition for the control of weeds in crops which comprises a mixture of at least one chlorobenzoic acid selected from the group comprising 2,3,6-trichlorobenzoic acid, 2,3,5,6-tetrachlorobenzoic acid and 2,6-dichlorobenzoic acid or salts or functional derivatives thereof and at least one phenoxyaliphatic acid hormone weedkiller compound.

Selective herbicides for use by farmers require to have quite a wide safety margin to allow for many variable factors such as the stage of growth of the crop, moisture content of the soil, humidity, temperature and weather generally. The compositions as described in Great Britain Patent No. 821,039 are perfectly satisfactory in normal use but suffer from the disadvantage that if applied incorrectly can cause a reduction in the crop yield.

It is known that the cereal crops have a higher tolerance towards the methoxy halogenated benzoic acids than to the halogenated benzoic acids, the compounds 2-methoxy-3,6-dichlorobenzoic acid and 2-methoxy-3,5,6-trichlorobenzoic acid being particularly preferred. However it has now been found that 2-methoxy-3,5,6-trichlorobenzoic acid is likely to cause crop damage when sprayed at too early a stage of development of the crop, the risk of damage decreasing while the season advances, whereas 2-methoxy-3,6-dichlorobenzoic acid is likely to cause crop damage when sprayed at a late stage of development.

It has now further been found that with a composition containing at least one phenoxyaliphatic acid hormone weedkiller compound and a mixture of 2-methoxy-3,6-dichlorobenzoic acid and 2-methoxy-3,5,6-trichlorobenzoic acid, there is an unexpected reduction in activity as regards the cereal crop (i.e., an antagonism), without any reduction in activity against the weeds. Indeed there is evidence that the 2-methoxy-3,6-dichlorobenzoic acid and 2-methoxy-3,5,6-trichlorobenzoic acid have an appreciable synergistic effect against the important weed Matricaria. Consequently the risk of crop damage can be reduced to a satisfactory level at all stages of crop development, by adjustment of the proportions of these compounds.

Accordingly the present invention is for a process for the control of weeds, including weeds resistant to the well-known substituted phenoxyacetic acid herbicides, in crops, particularly cereal crops, by applying to the crops a mixture of 2-methoxy-3,6-dichlorobenzoic acid and 2-methoxy-3,5,6-trichlorobenzoic acid, and one or more phenoxyaliphatic acid hormone weedkiller compounds, wherein the ratio of the amount of 2-methoxy-3,5,6-trichlorobenzoic acid to 2-methoxy-3,6-dichlorobenzoic acid lies in the range 1:1 and 4:1 and preferably between 2:1 and 3:1.

The mixture of methoxychlorobenzoic acids is suitably used at a rate of a half to eight ounces per acre. The acids referred to may of course be used in the form of the acids per se, or as salts as is conventional in the art.

The invention further provides a new composition comprising an admixture of 2-methoxy-3,5,6-trichlorobenzoic acid and 2-methoxy-3,6-dichlorobenzoic acid, as the acids or salts thereof, together with a selective phenoxyaliphatic acid hormone weedkiller, the ratio of the amount of 2-methoxy-3,5,6-trichlorobenzoic acid to 2-methoxy-3,6-dichlorobenzoic acid lying in the range 1:1 and 4:1 and preferably 2:1 and 3:1.

The proportion of the mixture of 2-methoxy-3,5,6-trichlorobenzoic acid and 2-methoxy-3,6-dichlorobenzoic acid in the composition according to the present invention is preferably such that when the composition is sprayed to give a rate of application to the ground of the said mixture of methoxychlorobenzoic acids of about half an ounce to eight ounces per acre, for example four ounces per acre; the concentration of the selective hormone weedkiller is appropriate to selectively control the weeds to be controlled with it. The ratio of the mixture of methoxychlorobenzoic acids to the selective hormone weedkiller may be in the range of about 1:0.25 and 1:20 by weight, and preferably in the range about 1:1 and 1:10 by weight.

All the ratios quoted in the specification are based on the compounds in the form of the acids.

The methoxychlorobenzoic acids employed herein may be used in the form of the pure compounds or as mixtures with other methoxychlorobenzoic acids. Following the usual practice in the art, the most economically produced compounds are used providing the impurities are not deleterious.

The methoxychlorobenzoic acids may be used as the salts, for example, alkali metal or amine salts. The compound is conveniently used in the form of water-soluble derivatives such as the alkali metal, amine and alkanolamine salts.

The term selective phenoxyaliphatic acid hormone weedkiller is used to indicate these compounds comprising phenoxyaliphatic acids such as 2,4-dichlorophenoxyacetic acid, 2-methyl-4-chlorophenoxyacetic acid, 2,4,5-trichlorophenoxyacetic acid, gamma-2,4-dichlorophenoxybutyric acid, gamma-2-methyl-4-chlorophenoxybutyric acid, alpha-2-methyl-4-chlorophenoxypropionic acid, and the like and their salts, for example, alkali-metal, amine and alkanolamine salts, which are selective weedkillers. These compounds are normally used at a rate of about 0.4 to 2 pounds per acre.

According to a preferred embodiment of the invention, the phenoxyaliphatic acid is 2-methyl-4-chlorophenoxyacetic acid and/or a salt thereof. According to another preferred embodiment the phenoxyaliphatic acid is 2,4-dichlorophenoxyacetic acid and/or a salt thereof.

According to a further preferred embodiment of the invention the composition comprises a mixture of 100 parts of 2-methyl-4-chlorophenoxyacetic acid, $x$ parts of 2-methoxy-3,6-dichlorobenzoic acid and $y$ parts of 2-methoxy-3,5,6-trichlorobenzoic acid, wherein $5x+2y$ equals between 80 and 200 parts, and preferably between 120 and 160 parts, the ratio $y:x$ lying in the range 1:1 to 4:1. The acids referred to are preferably in the form of water-soluble salts. The mixture may comprise for example the sodium and/or potassium salts or amine salts of the three acids.

The sodium and other alkali metal salts or amine salts of phenoxyaliphatic acids and the methoxychlorobenzoic acids are compatible and stable in aqueous solution. In these mixtures it is preferable to employ similar salts of the compounds, for example, a mixture of the sodium salts of 2-methyl-4-chlorophenoxyacetic acid and the methoxychlorobenzoic acids, or a mixture of amine salts of these acids.

The compositions according to the present invention may be used for the control of weeds in various crops, either applied as a pre-emergence dressing or as a post-emergence dressing. These compositions are more generally used as post-emergence dressings and may be used in this way for the control of weeds in cereals, for example wheat, barley, oats, rye, maize and rice crops.

The weeds which are controlled by the compositions according to the present invention include *Gallium aparine* (cleavers), *Stellaria media* (chickweed), *Polygonum convolvulus* (black bindweed), Matricaria spp. (mayweeds) and *Polygonum persicaria* (spotted knotgrass) in addition to the weeds controlled by the hormone type weedkillers.

These compositions also contribute materially to the suppression of certain perennial weeds which are susceptible to the hormone type weedkillers such for example as thistle and perennial nettle.

The benzoic and phenoxyaliphatic acids are preferably used in the form of water soluble salts, as is conventional in the art. Such salts are alkali metal, such as sodium or potassium; amine, such as methylamine, triethylamine or pyridine; or alkanolamine such as ethanolamine or diethanolamine; or ammonium salts.

The compositions according to the present invention may include any of the usual components such as surface active agents, stickers, diluents and other additives, used in the art. The compositions may be liquids suitable for spraying or powders suitable for dusting. The extent of dilution of the compositions according to the present invention for spraying appears to be non-critical. Thus for example the compositions may be applied at the same rate at any spray volume between 1 gallon per acre and 150 gallons per acre without significant variation. It is preferred however to spray at a volume of the order of 10–50 gallons per acre.

The following examples are given to illustrate the present invention.

*Example 1*

A composition (Composition A) was prepared and sprayed so as to apply 12 ounces per acre of 2-methyl-4-chlorophenoxyacetic acid (MCPA) and 1½ ounces per acre of 2-methoxy-3,6-dichlorobenzoic acid (Compound D) and 4 ounces per acre of 2-methoxy-3,5,6-trichlorobenzoic acid (Compound T).

A further composition (Composition B) was also prepared and sprayed so as to apply 12 ounces per acre of MCPA, 2 ounces per acre of Compound D and 5½ ounces per acre of Compound T.

Solely by way of comparison the following compositions were prepared so as to spray:

Composition C—12 ounces per acre of MCPA and 4 ounces per acre of Compound D.
Composition D—12 ounces per acre of MCPA and 11 ounces per acre of Compound T.

All these compositions contain the acids in the form of their sodium salts.

Eight replicate of each composition were sprayed on plots of 16 square yards on each of the cereal crops, spring wheat and spring barley, the crops being lightly infested with Matricaria spp.

Each mixture was applied at three stages of growth of the crops:

(a) When they had four leaves and were beginning to tiller;
(b) When they were fully tillered, but before jointing;
(c) When they were 24 inches high, but before ear emergence.

Yields were harvested and the averages of the yields for the two cereals are shown in the following trials. The figures are expressed as percentages of untreated controls.

YIELD AS PERCENT OF UNTREATED CONTROLS

| Stage of growth of crops | Composition A | Composition B | Composition C | Composition D |
| --- | --- | --- | --- | --- |
| a. Early | 98 | 97 | 102 | 85 |
| b. Medium | 105 | 100 | 95 | 98 |
| c. Late | 98 | 94 | 75 | 100 |

Adequate control of the weed Matricaria was obtained with Composition A; the additional concentrations of Compound D and Compound T in Composition B were unnecessary for satisfactory weed control. With Composition B the depression of crop yield is acceptable, and less than would be expected from the results of Compositions C and D. By taking advantage of the synergistic effect on Matricaria, this weed can be killed with negligible damage to the crop at all stages of spraying.

Observations of the plots at harvest showed that treatment with Composition A gave some deformities after the early application but careful examination revealed deformed flowers on only 20% of the ears. This level of damage would be quite acceptable in practice especially as yield was not affected, and the two later sprayings gave no effect on either crop.

Treatment with Composition B gave similar but more marked deformities but the level of damage would be quite acceptable.

The early and medium sprayings with Composition C showed no final visible effect, but the last spraying showed thin grey ears on the barley and sterility with blackened ears on the wheat.

The early spraying with Composition D had given severe ear deformity, with over 80% of the ears distorted on the barley and 60% on the wheat. These effects would be unacceptable to the farmer. The two later sprayings with Composition D gave no visible effect on either cereal.

*Example 2*

A composition (Composition E) was prepared and sprayed so as to apply 12 ounces per acre of 2-methyl-4-chlorophenoxyacetic acid (MCPA) and 1½ ounces per acre of 2-methoxy-3,6-dichlorobenzoic acid (Compound D) and 5 ounces per acre of 2-methoxy-3,5,6-trichlorobenzoic acid (Compound T).

In a similar manner a further composition (Composition F) was also prepared and sprayed so as to apply 12 ounces per acre of MCPA, 2 ounces per acre of Compound D and 3 ounces per acre of Compound T.

The compounds were present as the sodium salt, spraying was carried out on the same crop species as in Example 1, weed infestation again being light, and comparison was again made with Compositions C and D as in Example 1 with the following results.

| Stage of growth of crops | Composition E | Composition F | Composition C | Composition D |
| --- | --- | --- | --- | --- |
| a. Early | 100 | 92 | 100 | 87 |
| b. Medium | 102 | 98 | 92 | 100 |
| c. Late | 90 | 100 | 72 | 101 |

It is seen that Compositions E and F which are formulated according to the present invention are the more consistently effective at each stage of growth of the crop than Compositions C and D which are not formulated according to the invention.

*Example 3*

A composition (Composition G) was prepared and sprayed so as to apply 10 ounces per acre of 2,4-dichlorophenoxyacetic acid (2,4-D), 1½ ounces per acre of 2-methoxy-3,6-dichlorophenoxyacetic acid (Compound D) and 4 ounces per acre of 2-methoxy-3,5,6-trichlorobenzoic acid (Compound T).

Solely by way of comparison the following compositions were prepared so as to spray Composition H—10 ounces per acre of 2,4-D and 3 ounces per acre of compound D
Composition J—10 ounces per acre of 2,4-D and 10 ounces per acre of compound T.

These acids were used in the form of the very soluble diethanolamine salts. Spraying was carried out on winter wheat only with a light weed infestation with yield results as in the following table.

| Stage of growth of crop | Composition G | Composition H | Composition J |
|---|---|---|---|
| a. Early | 96 | 98 | 90 |
| b. Medium | 102 | 90 | 96 |
| c. Late | 98 | 84 | 101 |

It is seen that Composition G which is formulated according to the present invention is the more consistently effective at each stage of growth of the crop than Compositions H and J which are not formulated according to the present invention.

We claim:
1. A composition for the control of weeds which comprises a phenoxyaliphatic acid compound selected from the group consisting of 2,4-dichlorophenoxyacetic acid, 2-methyl-4-chlorophenoxyacetic acid, 2,4,5-trichlorophenoxyacetic acid, gamma-2,4-dichlorophenoxybutyric acid, gamma-2-methyl-4-chlorophenoxybutyric acid, alpha-2-methyl-4-chlorophenoxypropionic acid, water soluble alkali metal salts thereof, amine salts thereof, or alkanolamine salts thereof, a 2-methoxy-3,5,6-trichlorobenzoic acid compound selected from the group consisting of 2-methoxy-3,5,6-trichlorobenzoic acid, water soluble alkali metal salt thereof, amine salt thereof, or alkanolamine salt thereof, and a 2-methoxy-3,6-dichlorobenzoic acid compound selected from the group consisting of 2-methoxy-3,6-dichlorobenzoic acid, water soluble alkali metal salt thereof, amine salt thereof, or alkanolamine salt thereof, the weight ratio of the amount of the 2-methoxy-3,5,6-trichlorobenzoic acid compound expressed in terms of the acid to the amount of the 2-methoxy-3,6-dichlorobenzoic acid compound expressed in terms of the acid is from 1:1 to 4:1 and the weight ratio of the amount of the mixture of the methoxychlorobenzoic acid compounds expressed in terms of the acids to the amount of the phenoxyaliphatic acid expressed in terms of the acid is from 1:0.25 to 1:20.

2. A composition for the control of weeds which comprises a phenoxyaliphatic acid compound selected from the group consisting of 2,4-dichlorophenoxyacetic acid, 2-methyl-4-chlorophenoxyacetic acid, 2,4,5-trichlorophenoxyacetic acid, gamma-2,4-dichlorophenoxybutyric acid, gamma-2-methyl-4-chlorophenoxybutyric acid, alpha-2-methyl-4-chlorophenoxypropionic acid, water soluble alkali metal salts thereof, amine salts thereof, or alkanolamine salts thereof, a 2-methoxy-3,5,6-trichlorobenzoic acid compound selected from the group consisting of 2-methoxy-3,5,6-trichlorobenzoic acid, water soluble alkali metal salt thereof, amine salt thereof, or alkanolamine salt thereof, and a 2-methoxy-3,6-dichlorobenzoic acid compound selected from group consisting of 2-methoxy-3,6-dichlorobenzoic acid, water soluble alkali metal salt thereof, amine salt thereof, or alkanolamine salt thereof, the weight ratio of the amount of the 2-methoxy-3,5,6-trichlorobenzoic acid compound expressed in terms of the acid to the amount of the 2-methoxy-3,6-dichlorobenzoic acid compound expressed in terms of the acid lying is from 1:1 to 4:1 and the weight ratio of the amount of the mixture of the methoxychlorobenzoic acid compounds expressed in terms of the acids to the amount of the phenoxyaliphatic acid expressed in terms of the acid is from 1:1 to 1:10.

3. A composition as claimed in claim 1 wherein the phenoxyaliphatic acid compound is alpha-2-methyl-4-chlorophenoxypropionic acid.

4. A composition as claimed in claim 1 wherein the phenoxyaliphatic acid compound is 2-methyl-4-chlorophenoxyacetic acid.

5. A composition as claimed in claim 1 wherein the phenoxyaliphatic acid is 2,4-dichlorophenoxyacetic acid.

6. A composition for the control of weeds which comprises 100 parts by weight of a 2-methyl-4-chlorophenoxyacetic acid compound selected from the group consisting of 2-methyl-4-chlorophenoxyacetic acid, water soluble alkali metal salt thereof, amine salt thereof, or alkanolamine salt thereof, $x$ parts by weight of a 2-methoxy-3,6-dichlorobenzoic acid compound selected from the group consisting of 2-methoxy-3,6-dichlorobenzoic acid, water soluble alkali metal salt thereof, amine salt thereof, or alkanolamine salt thereof, and $y$ parts by weight of a 2-methoxy-3,5,6-trichlorobenzoic acid compound selected from the group consisting of 2-methoxy-3,5,6-trichlorobenzoic acid, water soluble alkali metal salt thereof, amine salt thereof, or alkanolamine salt thereof, wherein $5x+2y$ equals between 80 and 200 and the weight ratio $y:x$ is from 1:1 to 4:1.

7. A process for the control of weeds in crops which comprises applying to the crops a composition which comprises a phenoxyaliphatic acid compound selected from the group consisting of 2,4-dichlorophenoxyacetic acid, 2-methyl-4-chlorophenoxyacetic acid, 2,4,5-trichlorophenoxyacetic acid, gamma-2,4-dichlorophenoxybutyric acid, gamma-2-methyl-4-chlorophenoxybutyric acid, alpha-2-methyl-4-chlorophenoxypropionic acid, water soluble alkali metal salts thereof, amine salts thereof, or alkanolamine salts thereof, a 2-methoxy-3,5,6-trichlorobenzoic acid compound selected from the group consisting of 2-methoxy-3,5,6-trichlorobenzoic acid, water soluble alkali metal salt thereof, amine salt thereof, or alkanolamine salt thereof, and a 2-methoxy-3,6-dichlorobenzoic acid compound selected from the group consisting of 2-methoxy-3,6-dichlorobenzoic acid, water soluble alkali metal salt thereof, amine salt thereof, or alkanolamine salt thereof, the weight ratio of the amount of the 2-methoxy-3,5,6-trichlorobenzoic acid compound expressed in terms of the acid to the amount of the 2-methoxy-3,6-dichlorobenzoic acid compound expressed in terms of the acid is from 1:1 to 4:1.

References Cited by the Examiner
UNITED STATES PATENTS

| 2,992,913 | 7/1961 | Pfeiffer | 71—2.6 |
| 3,013,054 | 12/1961 | Richter | 71—2.6 X |
| 3,013,055 | 12/1961 | Richter | 71—2.6 X |

LEWIS GOTTS, *Primary Examiner.*

JULIAN S. LEVITT, *Examiner.*